Patented May 13, 1947

2,420,623

UNITED STATES PATENT OFFICE 2,420,623

PROCESS FOR PRODUCING THIONYL CHLORIDE

Walter H. Salzenberg, Wilmington, Del., and Michael Sveda, Cleveland, Ohio, assignors to E. I. du Pont de Nemours & Company, Wilmington, Del., a corporation of Delaware No Drawing. Application November 25, 1943, Serial No. 511,684

4 Claims. (Cl. 23—203)

This invention relates to the manufacture of thionyl chloride and is more particularly directed to processes involving the reaction of sulfur trioxide, chlorine, and sulfur monochloride at a temperature above about 100° C.

Thionyl chloride has heretofore been produced by batch processes and with only a poor yield.

It is an object of the present invention to provide a process for the reaction of sulfur trioxide and chlorine with sulfur monochloride to produce thionyl chloride with a high yield. It is a further object of this invention to provide a continuous process for the production of thionyl chloride. It is a still further obejct to provide processes for the production of thionyl chloride using sulfur trioxide, chlorine, and sulfur as raw materials. Still further objects will become apparent hereinafter.

The foregoing and other objects of the invention are attained by reacting sulfur trioxide and chlorine with sulfur monochloride at a temperature above about 100° C. For a continuous process the sulfur monochloride is contained in a heel which also contains a small amount of thionyl chloride, the equilibrium composition of the heel being maintained by withdrawing thionyl chloride as it forms and by supplying sulfur monochloride to the heel to replace any which is reacted or withdrawn.

Typically then, sulfur trioxide and chlorine are run in gaseous form into a liquid body containing sulfur monochloride. The liquid is maintained at a temperature above about 100° C. as more particularly described hereinafter and a mixture of thionyl chloride, sulfur monochloride, sulfur dichloride, and sulfur dioxide pass from the reaction vessel to a condenser. The sulfur dioxide together with some unreacted sulfur trioxide and chlorine pass through the condenser while thionyl chloride, sulfur monochloride and sulfur dichloride are removed as a liquid mixture.

The mixture is treated with sufficient sulfur to convert sulfur dichloride to sulfur monochloride and then thionyl chloride is distilled from the sulfur monochloride after which the sulfur monochloride may be returned to the reaction heel. The thionyl chloride from the distillation is the product of the process and it will be found to be of high purity and will represent a high yield on the basis of the reactants used.

As has been noted above, sulfur trioxide and chlorine are introduced into a liquid body of sulfur monochloride. The gases are preferably mixed before they are introduced into the sulfur monochloride and they are passed through a single tube to a point below the liquid level and introduced in the body of liquid. The gases could be introduced through separate tubes though it would be advisable to have some means of effecting agitation or of requiring the gases to pass upward through the liquid in a circuitous route. Instead of using gaseous chlorine and sulfur trioxide, these materials could be added as liquids.

The reaction of sulfur monochloride with sulfur trioxide and chlorine may be summed up as follows:

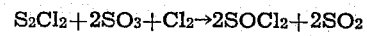
$$S_2Cl_2 + 2SO_3 + Cl_2 \rightarrow 2SOCl_2 + 2SO_2$$

According to this equation two mols of sulfur trioxide are required for each mol of chlorine but it is preferred that an excess of chlorine be maintained. Thus from about 1.5 to 2 mols of sulfur trioxide should be used for each mol of chlorine.

In the beginning of a batch operation or a continuous operation according to the invention the reactor should be partly, say about two-thirds filled with sulfur monochloride. The sulfur monochloride may conveniently be prepared in situ by putting molten sulfur into the reaction vessel and passing chlorine through it to produce sulfur monochloride. It will also be understood that in a continuous process of the invention the sulfur monochloride content of the heel may be increased by the addition of sulfur and by the use of the necessary extra chlorine.

In a batch process operated according to the present invention the sulfur monochloride is converted to thionyl chloride and the product together with some unreacted sulfur monochloride is removed by vaporization at the temperature of reaction.

In a continuous process according to the invention the sulfur monochloride will soon reach a constant composition and will form a heel to which chlorine, sulfur trioxide and sulfur monochlorine and, if desired, sulfur may be added as required.

The heel composition in a given process will depend upon the temperature of operation. At relatively low temperatures the thionyl chloride content of the heel will be greater than at relatively higher temperatures. The reaction vessel should be provided with suitable heating and cooling means to adjust the temperature so that the heel will contain from about 3 to 15 per cent of thionyl chloride. More specifically, under preferred conditions of operation, the heel will contain from about 6 to 10 per cent of thionyl chloride. The heel will also contain some sulfur pentoxydichloride which, if desired, can be recovered from time to time from the heel. The amounts of sulfur pentoxydichloride will be largest when relatively low temperatures are used.

Generally it will be found that a temperature of about 100° C. to 138° C. may be used for the batch or continuous processes of the present invention. The higher temperature is the boiling point of sulfur monochloride and of course a temperature somewhat below this should ordinarily be used. It will generally be found most desirable to use a temperature from about 105° to about 110° C.

Catalysts may be used in the reaction and there may be employed, for instance, a small amount of antimony trichloride. There may be used, say, 0.1 per cent to about 3 per cent of antimony trichloride. Instead of antimony trichloride any other catalyst for the reaction may be used and there may be employed, for instance, mercuric chloride or such chlorides of heavy metals as bismuth trichloride.

The vapors leaving the reaction vessel contain relatively large amounts of thionyl chloride and sulfur monochloride and a small amount of sulfur dichloride. The gases also contain sulfur dioxide and if the rate of flow of sulfur trioxide and chlorine is high then some of these may pass through unreacted. There will of course always be a small excess of chlorine. The vapors, as they leave the reaction vessel, can be condensed directly and distilled, or they may be partially condensed, as in a reflux condenser, and the sulfur monochloride-rich condensate returned to the reaction. Preferably the vapors may go directly to a fractionating column for complete separation of sulfur monochloride.

Instead of adding sulfur or sulfur mono-chloride to the reaction vessel, it may be found most advantageous to pass the effluent gases from the reaction through molten sulfur. This can be done for example by passing the gases through a packed tower over which molten sulfur is flowed. The chlorine and the sulfur dichloride in the effluent gases will, of course, react with the sulfur to form sulfur monochloride. Following the sulfur treatment the gases can be passed to a plate column fractionating tower or else condensed for later distillation.

The relatively low boiling gases such as sulfur dioxide and some of the sulfur trioxide may be recovered in various suitable ways and one may, if desired, oxidize the sulfur dioxide to sulfur trioxide and use the mixture after a suitable addition of chlorine for reaction with sulfur monochloride.

If the vapors leaving the reaction vessel are simply condensed the condensate can be boiled to distil off the thionyl chloride from sulfur monochloride and the sulfur monochloride may be returned to the reaction heel. If the effluent vapors were not treated with sulfur then sulfur may be used before the distillation of the condensate to effect conversion of the sulfur dichloride to sulfur monochloride.

In order that the invention may be better understood reference should be had to the following illustrative examples:

Example I

Eighty pounds (0.592 pound-mols) of sulfur monochloride and 0.8 pound of antimony trichloride were placed in a cylindrical, iron reaction vessel, 12" internal diameter and 36" high, fitted with a heating and cooling jacket, a condenser, and a gas inlet tube extending 10" below the surface of the liquid. The liquid was preheated to 100° C., and gaseous chlorine and sulfur trioxide were continuously premixed in a molar ratio of $1.79SO_3:1Cl_2$, and led beneath the surface of the sulfur monochloride at a rate of 24.3 pounds (0.304 pound-mols) of sulfur trioxide and 12.1 pounds (0.171 pound-mols) of chlorine per hour. Simultaneously, but through a separate inlet tube, sulfur monochloride was added continuously at a rate of 51.7 pounds (0.383 pound-mols) per hour. The heat of reaction was sufficient to maintain the liquid in the vessel at 107° C., a temperature 30° C. above the boiling point of thionyl chloride, and a mixture of thionyl chloride and sulfur monochloride containing some sulfur dichloride was continuously distilled off. The condensate, 225.5 pounds, containing about 40 per cent thionyl chloride, 10 per cent dissolved sulfur dioxide, 10 per cent sulfur dichloride, and about 40 per cent sulfur monochloride, was distilled over elemental sulfur in order to convert low-boiling sulfur dichloride to high-boiling sulfur monochloride, resulting in a thionyl chloride fraction of high purity. By distilling the crude fraction collected during a 3-hour run, as outlined above, 95.9 pounds (0.766 pound-mols) of thionyl chloride was obtained, corresponding to 92 per cent yield based on a combined sulfur and chlorine output.

Example II

A process of the invention was carried out as in Example I at a temperature of about 107° to 110° C. but differs largely from Example I in taking the effluent gases from the reaction vessel and passing them through molten sulfur and then through a plate column fractionating tower. The sulfur monochloride obtained from the bottom of the fractionating column was returned to the reaction vessel and the thionyl chloride product was of excellent purity. The yields were substantially the same as in Example I.

While certain illustrative processes have been shown it will be understood that the invention is not to be limited thereby but that various processes may be employed reacting sulfur trioxide, chlorine, and sulfur monochloride without departing from the spirit of this invention.

We claim:

1. In a continuous process for the production of thionyl chloride the steps comprising passing sulfur trioxide and chlorine at the rate of 1.5 to 2 mols of sulfur trioxide to each mol of chlorine into a heel of liquid sulfur monochloride which contains about 3 to 15 per cent of thionyl chloride and which is maintained at a temperature of about 105° to 110° C., removing vapors from the reaction zone through a partial condenser, condensing the vapors withdrawn but permitting sulfur dioxide, sulfur trioxide, and chlorine to be separated therefrom, treating the condensate with sulfur to convert any sulfur dichloride to sulfur monochloride and distilling thionyl chloride from the condensate, separating the sulfur monochloride from any unused sulfur, and returning it to the said heel.

2. In a continuous process for the production of thionyl chloride the steps comprising passing sulfur trioxide and chlorine at the rate of 1.5 to 2 mols of sulfur trioxide to each mol of chlorine into a heel of liquid sulfur monochloride which contains about 3 to 15 per cent of thionyl chloride and which is maintained at a temperature of about 105° to 110° C., removing vapors from the reaction zone, treating the vapors with sulfur, fractionating the vapors to separate the thionyl chloride product from sulfur monochloride, and returning sulfur monochloride to the said heel.

3. In a process for the production of thionyl chloride the steps comprising passing sulfur trioxide and chlorine into a heel of liquid sulfur monochloride which contains thionyl chloride and which is maintained at a temperature of about 105° to 110° C., removing vapors from the reaction zone, treating the product thus withdrawn with sulfur to effect conversion of sulfur dichloride to sulfur monochloride.

4. In a process for the production of thionyl chloride the steps comprising passing sulfur trioxide and chlorine into a heel of liquid sulfur monochloride which contains thionyl chloride and which is maintained at a temperature above about 100° C., removing vapors from the reaction zone, treating the product thus withdrawn with sulfur to effect conversion of sulfur dichloride to sulfur monochloride.

WALTER H. SALZENBERG.
MICHAEL SVEDA.

REFERENCES CITED

The following references are of record in the file of this patent:

FOREIGN PATENTS

| Number | Country | Date |
|---|---|---|
| 139,455 | Germany | June 21, 1902 |

OTHER REFERENCES

Inorganic and Theoretical Chemistry, Mellor, vol. X; Longmans, London, pages 657 and 658. (Copy in Div. 59.)